(No Model.)

P. H. O'HARA.
COFFEE OR TEA POT.

No. 270,463. Patented Jan. 9, 1883.

WITNESSES:
Theo. J. Hoth.
C. Sedgwick

INVENTOR:
P. H. O'Hara
BY Munn & Co
ATTORNEYS.

UNITED STATES PATENT OFFICE.

PATRICK H. O'HARA, OF PHILADELPHIA, PENNSYLVANIA.

COFFEE OR TEA POT.

SPECIFICATION forming part of Letters Patent No. 270,463, dated January 9, 1883.

Application filed May 19, 1882. (No model.)

*To all whom it may concern:*

Be it known that I, PATRICK H. O'HARA, of Philadelphia, in the county of Philadelphia and State of Pennsylvania, have invented a new and Improved Coffee or Tea Pot, of which the following is a full, clear, and exact description.

The object of my invention is the perfect extraction from coffee, tea, or other material of its essential essence, (subject to the solvent power of steam or boiling water,) retaining and preserving the flavor and fragrance of its peculiar aroma in the perfect condensation of the steam or vapor as generated in the pot.

The nature of the invention consists of a main chamber or vessel having a strainer combined with an upper water vessel or chamber, divided by a filtering-partition and having a tapering collar or socket projecting above and below its bottom, and having a series of apertures in that part above the bottom of the water-chamber, a handled conical plug fitting in said socket, substantially as hereinafter more fully set forth.

Reference is to be had to the accompanying drawings, forming part of this specification, in which similar letters of reference indicate corresponding parts in both the figures.

Figure 1:
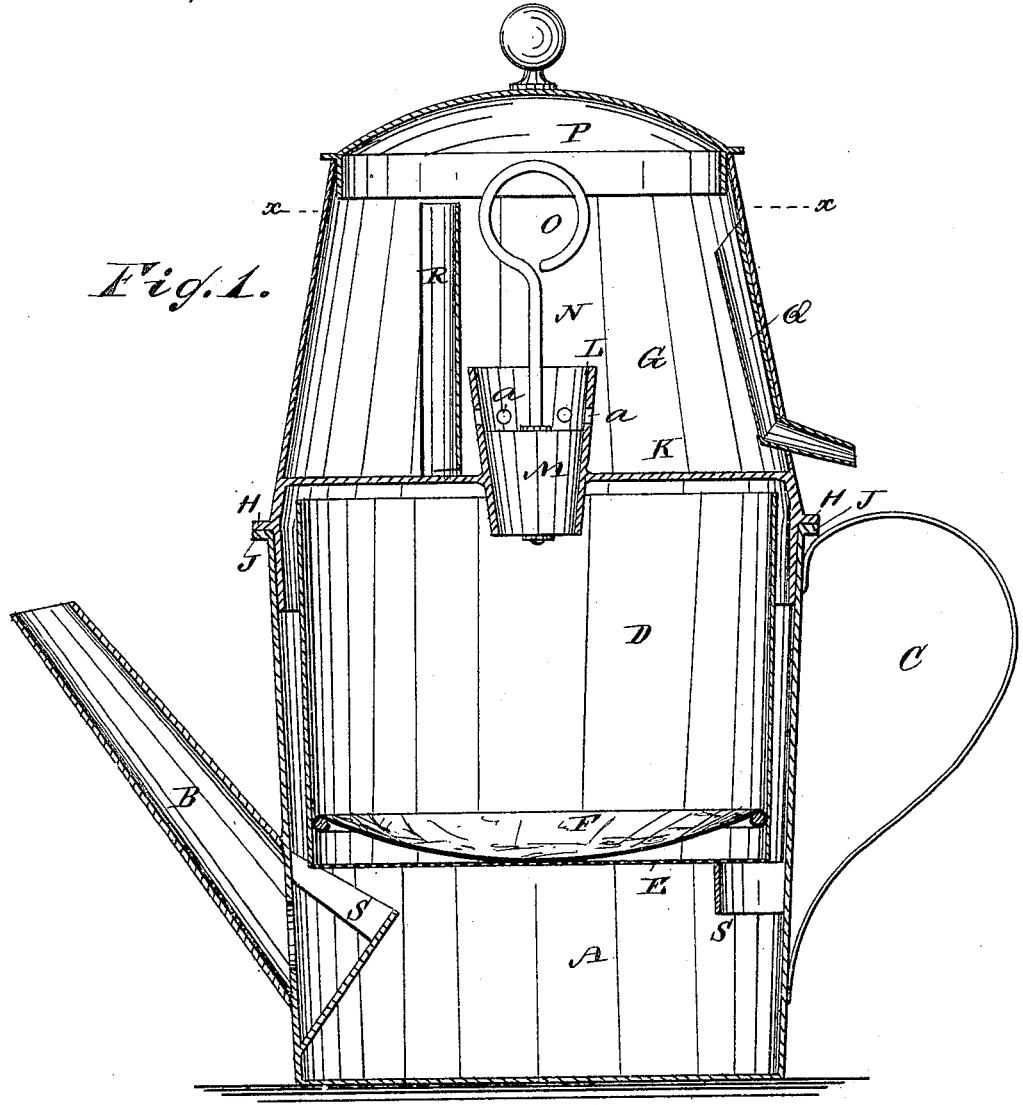
Figure 2:
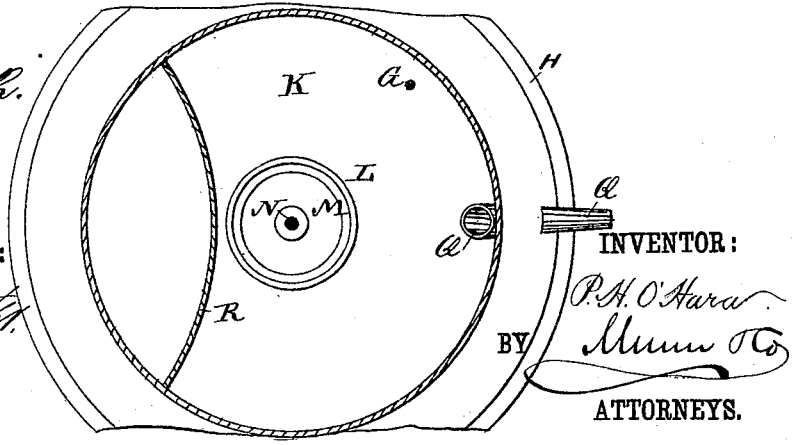

Figure 1 is a sectional elevation of my improved coffee or tea pot. Fig. 2 is a sectional plan view of the same on the line *x x*, Fig. 1.

The vessel A, made in the shape of an inverted frustum of a cone, is provided with a spout, B, and a handle, C, in the usual manner. A vessel, D, fitting within the vessel A, is provided with a perforated bottom, E, and contains a removable filter or strainer, F, made of flannel or some other fabric or suitable material, which filter is held directly above the perforated bottom of the vessel D. A vessel, G, having the shape of a frustum of a cone, fits into the upper part of the vessel A, and is provided with an annular external flange, H, a short distance above its lower end, which flange H is adapted to rest on the external top flange, J, of the vessel A. The vessel G is provided with a bottom, K, provided with a central tapering collar, L, provided with a series of side apertures, *a*. A beveled stopper, M, fitting in the collar L, is attached to an upwardly-projecting rod, N, provided with an eye or loop, O, at its upper end. A cover, P, fits on the vessel G. The vessel G is provided with an overflow-tube, Q, the lower end of which projects from the side of this vessel G. The vessel G is also provided with a filter, R, through which the water must pass before it can pass into the vessel G. I have shown this filter R arranged as a transverse partition; but it can be arranged in any other suitable manner. The vessel D rests on two or more projections, S, on the inner side of the vessel A.

The coffee, tea, or other material from which the essence or aroma is to be extracted is placed in the vessel D and on the filter or strainer F. If the stopper or plug M is withdrawn, the water can pass from the vessel G upon the coffee or other material on the strainer F, and percolates through this material into the vessel A, in which it collects. The steam that rises in the vessels A and D condenses on the under side of the bottom K of the vessel G.

The required quantity of water can be admitted into the vessel A by simply raising the plug M, and the pot need not be taken apart.

The projection S at the lower or inner end of the spout is arranged to prevent the steam from passing out through the spout B.

Having thus fully described my invention, I claim as new and desire to secure by Letters Patent—

The coffee or tea pot consisting of the main chamber or vessel A, having the filter D E F, and the upper or water chamber, G, adapted to fit upon the vessel A, and having the subdividing filtering partition R, and the tapering collar or socket L, extended above and below its bottom, and provided above said bottom with a series of apertures, *a a*, said socket having a handled conical plug, M, substantially as shown and described.

PATRICK H. O'HARA. [L. S.]

Witnesses:
ADAM CLARK,
H. P. ROCHE.